United States Patent

Ng et al.

[11] Patent Number: 5,581,614
[45] Date of Patent: Dec. 3, 1996

[54] METHOD FOR ENCRYPTING AND EMBEDDING INFORMATION IN A VIDEO PROGRAM

[75] Inventors: Yee K. Ng, Tai Po, Hong Kong; Roy J. Mankovitz, Encino, Calif.

[73] Assignee: Index Systems, Inc., Tortola, Virgin Islands (Br.)

[21] Appl. No.: 183,602

[22] Filed: Jan. 18, 1994

Related U.S. Application Data

[63] Continuation of Ser. No. 167,678, Dec. 15, 1993, abandoned, which is a continuation-in-part of Ser. No. 66,666, May 27, 1993, which is a continuation-in-part of Ser. No. 14,541, Feb. 8, 1993, abandoned, which is a continuation-in-part of Ser. No. 1,125, Jan. 5, 1993, abandoned, which is a continuation-in-part of Ser. No. 883,607, May 7, 1992, abandoned, which is a continuation-in-part of Ser. No. 817,723, Jan. 7, 1992, abandoned, which is a continuation-in-part of Ser. No. 805,844, Dec. 5, 1991, abandoned, which is a continuation-in-part of Ser. No. 747,127, Aug. 19, 1991, abandoned.

[51] Int. Cl.$^6$ .................................. H04L 9/00; H04L 9/08
[52] U.S. Cl. ................................................. 380/20; 380/21
[58] Field of Search .............................. 380/3, 5, 21, 20

[56] References Cited

U.S. PATENT DOCUMENTS

| | | | |
|---|---|---|---|
| Re. 29,259 | 6/1977 | Sabsay | 340/149 A |
| 2,875,270 | 2/1959 | Wendt et al. | 178/5.1 |
| 2,977,434 | 3/1961 | Shanahan | 200/46 |
| 3,504,286 | 3/1970 | Jacobaeus | 325/32 |
| 3,659,046 | 4/1972 | Angeleri et al. | 178/22 |
| 3,777,053 | 12/1973 | Wittig et al. | 178/5.1 |
| 3,890,461 | 6/1975 | Vogelman et al. | 178/5.1 |
| 4,012,583 | 3/1977 | Kramer | 358/84 |
| 4,100,575 | 7/1978 | Morio et al. | 358/120 |
| 4,205,343 | 5/1980 | Barrett | 358/147 |
| 4,215,366 | 7/1980 | Davidson | 358/124 |
| 4,337,483 | 6/1982 | Guillou | 358/114 |
| 4,393,404 | 7/1983 | Cox et al. | 358/147 |
| 4,405,829 | 9/1983 | Rivest et al. | 178/22.1 |
| 4,425,586 | 1/1984 | Miller | 358/335 |
| 4,488,179 | 12/1984 | Krüger et al. | 358/181 |
| 4,494,143 | 1/1985 | Lovick et al. | 358/122 |
| 4,516,166 | 5/1985 | Tellone | 360/72.1 |
| 4,530,048 | 7/1985 | Proper | 364/200 |
| 4,531,021 | 7/1985 | Bluestein et al. | 380/21 |
| 4,595,950 | 6/1986 | Löfberg | 358/122 |
| 4,600,921 | 7/1986 | Thomas | 340/825.31 |
| 4,600,989 | 7/1986 | Schwartz et al. | 364/200 |
| 4,636,854 | 1/1987 | Crowther et al. | 380/20 |
| 4,663,659 | 5/1987 | Blatter | 380/14 |
| 4,689,022 | 8/1987 | Peers et al. | 434/307 |
| 4,694,489 | 9/1987 | Frederiksen | 380/20 |
| 4,706,121 | 11/1987 | Young . | |
| 4,736,422 | 4/1988 | Mason | 380/20 |
| 4,748,668 | 5/1988 | Shamir et al. | 380/30 |

(List continued on next page.)

OTHER PUBLICATIONS

Japanese Patent Abstract, Publication No. 4-78065(A), Publication Date 1992, p. 1.
Japanese Patent Abstruct, Publication No. 61-288672(A), Publication Date 1986 p. 1.
Veith, Richard H. *Televisions Teletext*, Jan. 1, 1983, pp. 1-6, North-Holland; R. H. Veith, *Television's Teletext* pp. 9, 12, 17, 19, 32, 46, 136, 137, 139.

*Primary Examiner*—Salvatore Cangialosi
*Attorney, Agent, or Firm*—Christie, Parker & Hale, LLP

[57] ABSTRACT

Apparatus and methods are provided for encrypting and decrypting information having a header portion and a body portion. The decrypting method includes the steps of reading a current month from a clock, extracting an odd/even month indication from the header portion, generating a first key based on the current month if the odd/even indication is odd and the current month is odd or if the odd/even indication is even and the current month is even, otherwise generating the first key based on a month previous to the current month read from the clock if the odd/even indication is odd and the current month is even or if the odd/even indication is even and the current month is odd, and using the first key for decrypting the encrypted body portion to generate a decrypted body portion.

43 Claims, 13 Drawing Sheets

U.S. PATENT DOCUMENTS

| | | | |
|---|---|---|---|
| 4,796,223 | 1/1989 | Sugita et al. | 364/900 |
| 4,802,215 | 1/1989 | Mason | 380/20 |
| 4,803,551 | 2/1989 | Park | 358/147 |
| 4,805,020 | 2/1989 | Greenberg | 358/147 |
| 4,825,467 | 4/1989 | Rist et al. | 380/7 |
| 4,829,569 | 5/1989 | Seth-Smith et al. | 380/10 |
| 4,866,770 | 9/1989 | Seth-Smith et al. | 380/20 |
| 4,890,319 | 12/1989 | Seth-Smith et al. | 380/20 |
| 4,890,321 | 12/1989 | Seth-Smith et al. | 380/20 |
| 4,903,297 | 2/1990 | Rist et al. | 380/7 |
| 4,937,866 | 6/1990 | Crowther et al. | 380/20 |
| 4,944,006 | 7/1990 | Citta et al. | 380/20 |
| 4,985,783 | 1/1991 | Falck | 358/335 |
| 4,993,066 | 2/1991 | Jenkins | 380/16 |
| 4,995,080 | 2/1991 | Bestler et al. | 380/21 |
| 5,023,908 | 6/1991 | Weiss | 380/23 |
| 5,027,288 | 6/1991 | Suzuki et al. | 364/519 |
| 5,034,819 | 7/1991 | Tsukagoski | 358/191.1 |
| 5,081,678 | 1/1992 | Kaufman et al. | 380/21 |
| 5,101,508 | 3/1992 | Owaki | 455/158 |
| 5,144,664 | 9/1992 | Esserman et al. | 380/20 |
| 5,146,495 | 9/1992 | Son | 380/5 |
| 5,170,252 | 12/1992 | Gear et al. | 358/181 |
| 5,172,413 | 12/1992 | Bradley et al. | 380/20 |
| 5,222,136 | 6/1993 | Rasmussen et al. | 380/9 |
| 5,321,750 | 6/1994 | Nadan | 380/20 |
| 5,335,277 | 8/1994 | Harvey et al. | 380/20 |
| B1 4,706,121 | 12/1993 | Young | 358/142 |

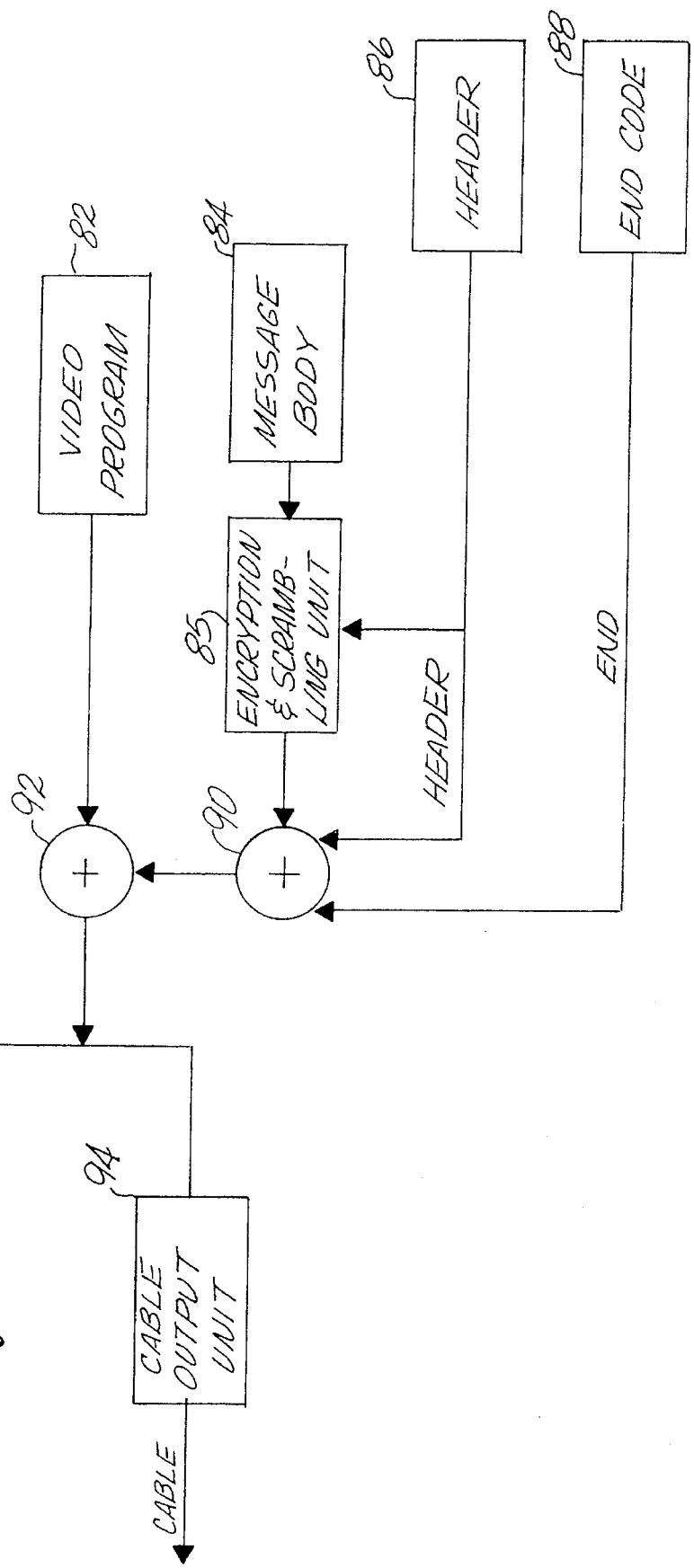

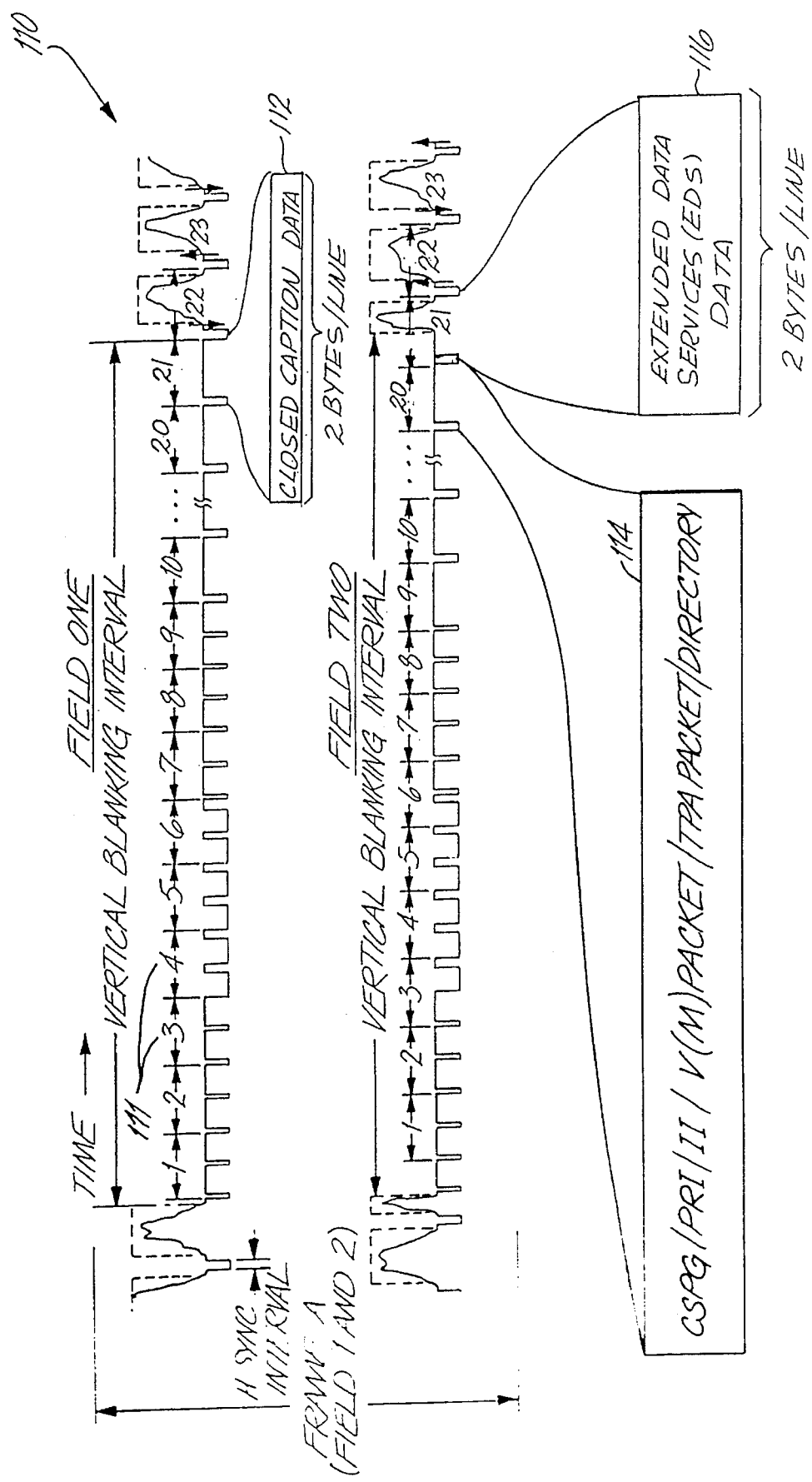

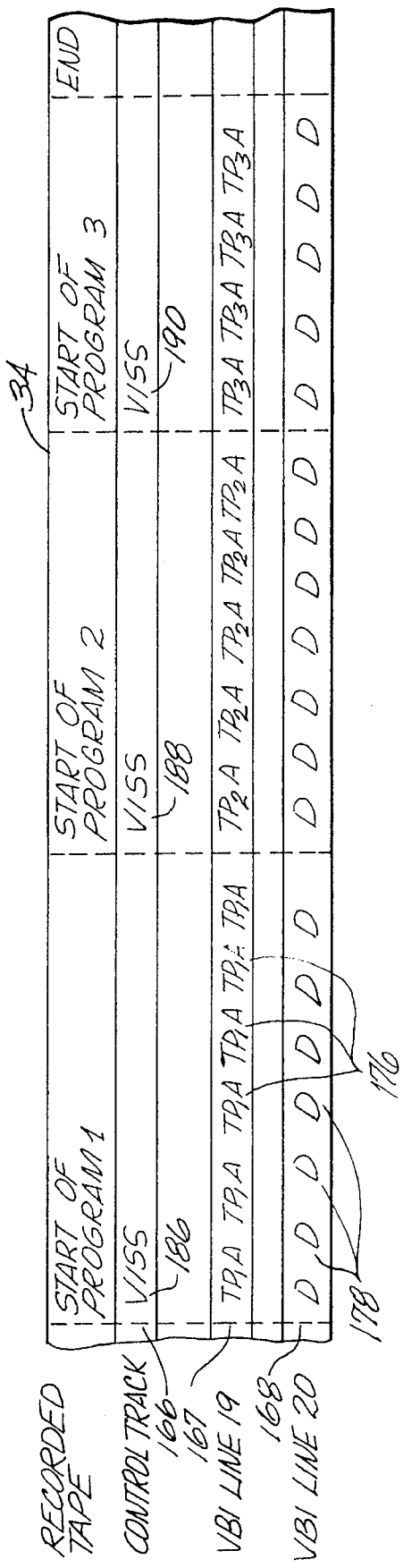

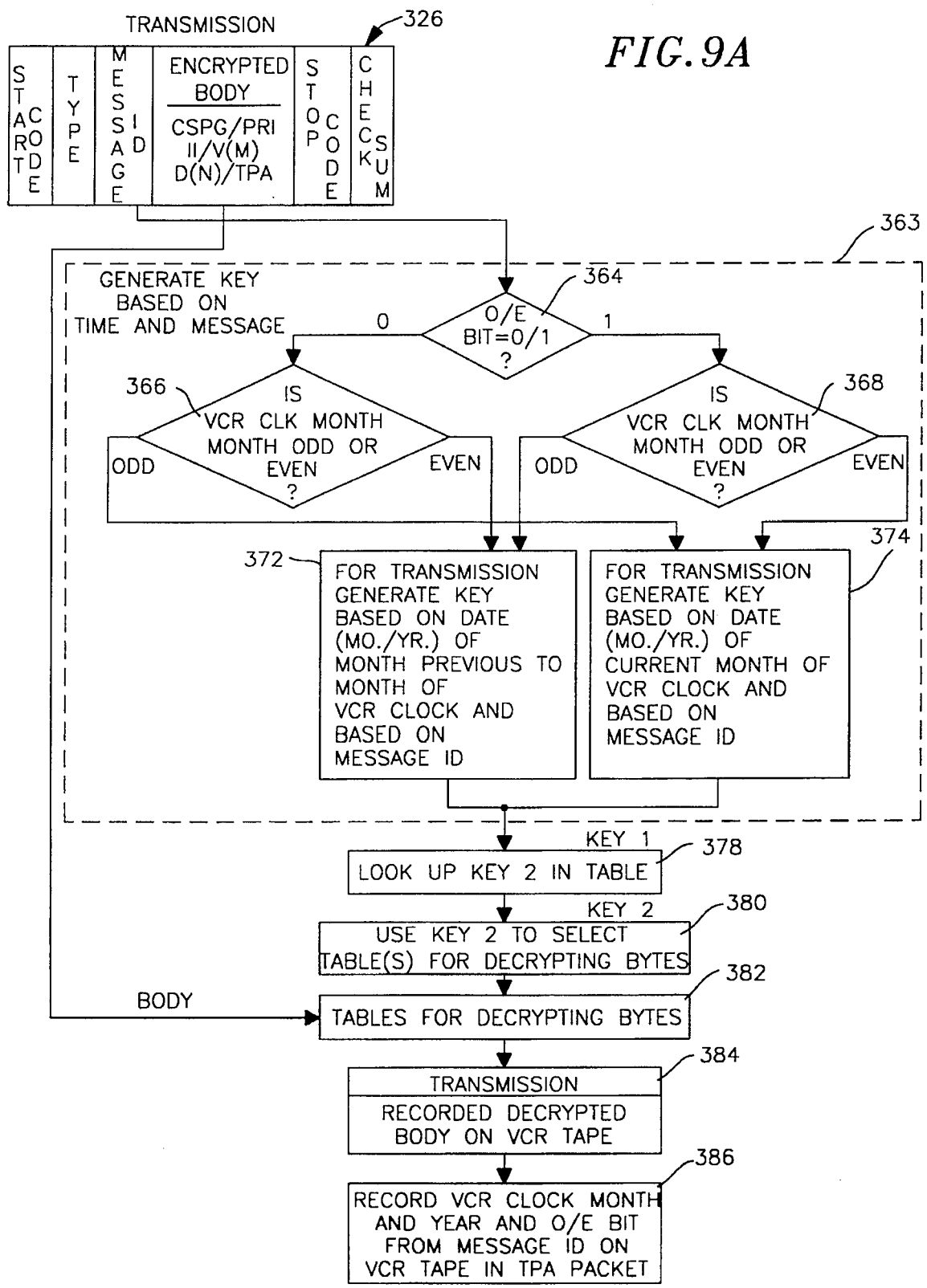

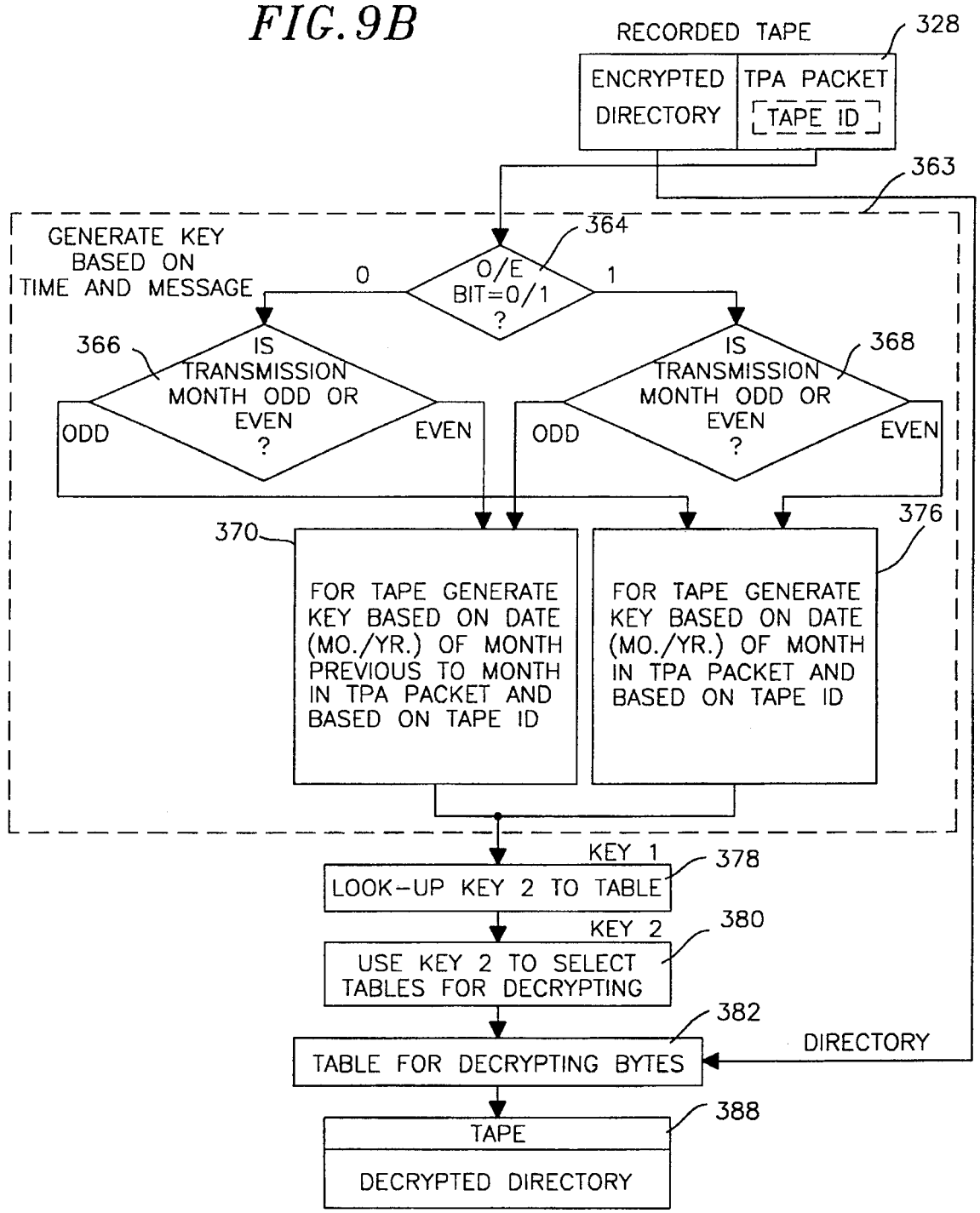

METHOD FOR ENCRYPTING AND EMBEDDING INFORMATION IN A VIDEO PROGRAM

This is a continuation of application Ser. No. 08/167,678 filed Dec. 15, 1993 now abandoned, which is a continuation-in-part of application Ser. No. 08/066,666, filed May 27, 1993, which is a continuation-in-part of application Ser. No. 08/014,541, filed Feb. 8, 1993 now abandoned, which is a continuation-in-part of application Ser. No. 08/001,125 now abandoned, filed Jan. 5, 1993, which is a continuation-in-part of application Ser. No. 07/883,607, filed May 7, 1992 now abandoned, which is a continuation-in-part of application Ser. No. 07/817,723, filed Jan. 7, 1992 now abandoned, which is a continuation-in-part of application Ser. No. 07/805,844, filed Dec. 5, 1991 now abandoned, which is a continuation-in-part of application Ser. No. 07/747,127, filed Aug. 19, 1991 now abandoned. The subject matter of all of the above referenced patent applications and continuation-in-part applications are incorporated herein by this reference, as though set forth in full.

BACKGROUND OF THE INVENTION

1. Field of the Invention

This invention relates generally to methods for scrambling and encrypting information embedded in a video program that is transmitted over the air, cable, satellite or telephone lines, or that is recorded on a video cassette tape.

2. Description of the Related Art

Television programs can include closed captioning and other information embedded in the program. This information can be embedded in the vertical blanking interval (VBI) lines (described below) of a television video signal. A VBI decoder in a VCR or a television is used to retrieve the closed captions, which are for the hearing impaired, and other information from the VBI lines. The closed captions are then displayed as text on the television monitor along with the video.

Other information can also be embedded in the VBI lines. For example, a directory to programs can be embedded in the VBI lines. The directory can either be transmitted in the VBI lines during a transmission over the air, cable, satellite or telephone lines or stored in the VBI lines of a video cassette tape along with the programs on the video cassette tape. The directory can then be used to control a video cassette recorder (VCR) to access programs on the video cassette tape. Such a system is described in the above mentioned application Ser. No. 08/066,666. Other information in the VBI lines can include channel specific program guide (CSPG), program related information (PRI), Instant Information (II), video magazine (V(M)) packet, and tape identification, program number and absolute address (TPA) packet, which are described below.

Since the information provides valuable services for users, it is necessary to control access to the information to only authorized users. Otherwise revenue for the services cannot be collected.

Accordingly, there is a need in the art for methods for scrambling and encrypting information embedded in a video program that is either transmitted or that is recorded on a video cassette tape. There is also a need in the art for methods for descrambling and decrypting information embedded in a video program.

SUMMARY OF THE INVENTION

According to the invention, methods are provided for encrypting and decrypting information having a header portion and a body portion.

The method for encrypting information having a header portion and a body portion includes the steps of reading a first current month from a clock having an output as a function of time, setting an odd/even month indication in the header portion to odd, if the first current month read from the clock is an odd month, otherwise, setting an odd/even month indication in the header portion to even, if the first current month read from the clock is an even month, generating a first key based on a second current month read from the clock if the odd/even indication is odd and the second current month read from the clock is odd or if the odd/even indication is even and the second current month read from the clock is even, otherwise generating the first key based on a month previous to the second current month read from the clock if the odd/even indication is odd and the second current month read from the clock is even or if the odd/even indication is even and the second current month read from the clock is odd, using the first key for encrypting the body portion to generate an encrypted body portion, and embedding the encrypted body portion and the header portion within a video signal to form a composite video signal.

The decrypting method includes the steps of reading a current month from a clock having an output as a function of time, extracting an odd/even month indication from the header portion, generating a first key based on the current month read from the clock if the odd/even indication is odd and the current month read from the clock is odd or if the odd/even indication is even and the current month read from the clock is even, otherwise generating the first key based on a month previous to the current month read from the clock if the odd/even indication is odd and the current month read from the clock is even or if the odd/even indication is even and the current month read from the clock is odd, and using the first key for decrypting the encrypted body portion to generate a decrypted body portion.

BRIEF DESCRIPTION OF THE DRAWINGS

The features of specific embodiments of the best mode contemplated of carrying out the invention are illustrated in the drawings, in which:

FIG. 1B is a block diagram of a transmitter in accordance with principles of the invention.

FIG. 3 is a diagram illustrating the timing of the vertical blanking interval (VBI) lines of an interlaced television scanning raster and the information that can be embedded in the VBI lines.

FIG. 4 is a schematic view of an embodiment for recorded tapes illustrating storing VISS marks on a control track, TPA packets each containing a tape identification number, a program number, and an absolute address in a vertical blanking interval line, and a directory in a vertical blanking interval line in accordance with principles of the invention.

FIG. 9A is a flow chart of a method for decrypting information embedded in a video program that is transmitted according to the present invention.

FIG. 9B is a flow chart of a method for decrypting information embedded in a video program that is recorded on a video cassette tape according to the present invention.

DETAILED DESCRIPTION

Figure 1A:
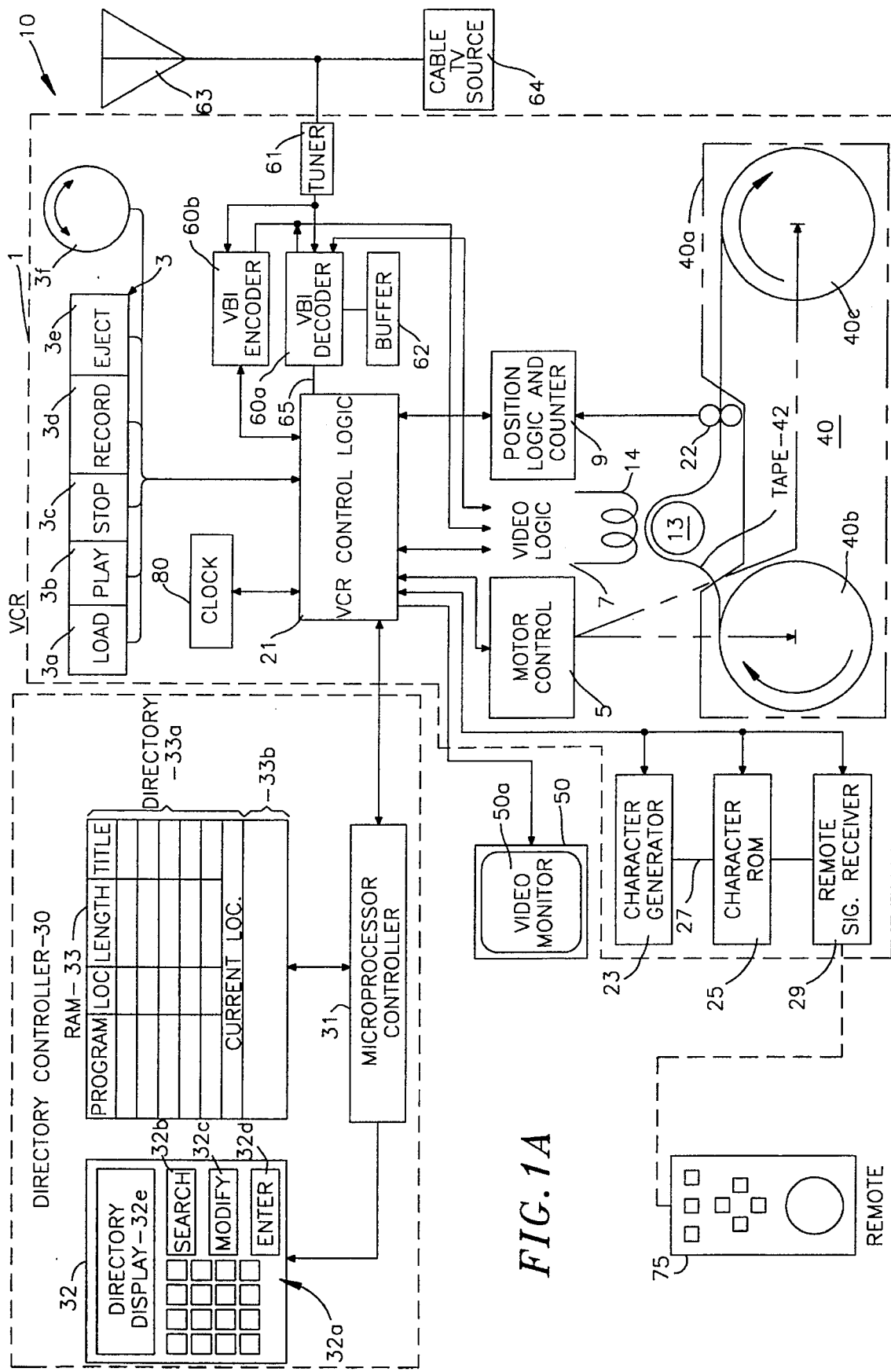
FIG. 1A is a block diagram illustrating an indexing video cassette recorder that operates with a directory controller to provide access to indexed programs recorded on a video cassette tape in accordance with principles of the invention.

Referring to the drawings, FIG. 1A is a block diagram of an indexing VCR system 10 including a video cassette recorder (VCR) 1 with a video tape cassette 40, a video display 50, and a directory controller 30. The VCR 1 is a conventional video cassette recorder device and uses any one of many different recording technologies such as BETA, VHS, super VHS, 8 mm, VHS-C or any other popular technology. Particularly useful are VHS-C indexed tapes, which can be played directly on a VHS indexing VCR that has a full index function as described in U.S. application Ser. No. 08/066,666. The cassette 40 is a conventional video cassette having a magnetic tape 42 packaged in a cartridge or cassette housing. Even though the size and design of the housing is different for different types of recording technology, the basic information that goes on the tape itself is similar. The technology and operation of a VCR are well understood in the art.

The VCR 1 has a button control panel 3 with control buttons, including LOAD 3a, PLAY 3b, STOP 3c, RECORD 3d, and EJECT 3e, for controlling the operation of the VCR 1. The LOAD button 3a is optional and is not used on machines which load automatically. The VCR control logic circuit 21 receives control signals from the button control panel 3 and controls the overall operation of the VCR 1 by sending control signals to motor control 5, a video logic circuit 7, and a position logic and counter circuit 9, as well as, to video display 50 and microprocessor controller 31 of the directory controller 30. A clock 80 can be set to a time and read by the VCR control logic. The VCR control logic 21 can be implemented with a microprocessor and a memory for storing programs to implement the steps of the methods of the invention.

The motor control 5 controls loading and ejecting of the cassette 40 and also controls movement of the video tape 42 within the video cassette 40 during record, play, search, fast forward, and rewind operations. The video logic circuit 7 controls the operation of video read/write head 14 in reading from or recording video signals to the tape 42. As a program is recorded and played, the tape 42 is passed around capstan 13. The speed of capstan 13 is controlled by motor control 5 to maintain a constant linear tape speed during record, play and search operations. Search speed is about twice as fast as play speed. In rewind and fast forward operations the tape speed is controlled by the speed of the supply or take-up reels. The position logic and counter circuit 9 monitors tape movement through a cassette tape movement sensor 22 and generates signals that represent tape position.

The directory controller 30 includes a microprocessor controller 31, a random access memory (RAM) 33 and a directory input/output display and control panel 32. Preferably the microprocessor controller 31 includes an integrated circuit microprocessor, and a program store, such as a read-only-memory (ROM), for storing a control program, and a clock for generating a clock signal for timing functions and providing the time. The time may be set using the directory input/output display and control panel 32 in a manner known in the art. Alternatively, the VCR 1 may maintain the time with clock 80. The RAM 33 is a conventional random access semiconductor memory which interfaces directly with the microprocessor controller 31. The RAM 33 is preferably non-volatile. Alternatively, the RAM 33 is battery backed up. A portion of the RAM 33 is shown as 33b, which is used for storing the system software of the microprocessor controller 31. The RAM 33 is also used for storing the program directory 33a.

The directory input/output display and control panel 32 has an alphanumeric keyboard 32a and special function keys, such as a SEARCH key 32b for commanding searches for data in the directory 33a and on the tape 42, a MODIFY key 32c for modifying or deleting directory information in the RAM 33, and an ENTER key 32d for entering program directory information. Instead of providing special function keys, functions can also be initiated by entering predefined sequences of conventional keys on the alphanumeric keyboard 32a.

A display 32e is a conventional liquid crystal or other type display for displaying data being entered on the keyboard 32a, and to display the directory or other information stored in the RAM 33. Alternately, as discussed below, an on-screen display on video monitor 50a can be used. The directory information stored in the RAM 33 is processed by the microprocessor controller 31.

The VCR 1 additionally comprises a character generator circuit 23 coupled to the VCR control logic circuit 21 and to a character generator read-only memory (ROM) 25. Character generators are well-known in the art. Typically, the character generator ROM 25 stores a data table representing pixel or bit patterns of a plurality of alphanumeric characters, such as the Roman alphabet and the Arabic numerals. Upon command by the VCR control logic circuit 21 and the character generator circuit 23, the data in the character generator ROM 25 is read and placed in an output signal to the video monitor 50a at a position on the display determined by coordinates generated by the microprocessor controller 31. The end result is visual display of a alphanumeric character on the display screen. Character generators are well-known for on screen channel display in television receivers. The video monitor 50a is preferably 36 characters×15 rows.

FIG. 1B is a block diagram of a transmitter in accordance with principles of the invention. The message body 84, which is described below, is encrypted and scrambled by encryption and scrambling unit 85. The encryption and scrambling are performed as a function of information in the header 86, which is further described below. Then header 86 and end code 88 are combined with the encrypted message body by combiner 90. Then the output of combiner 90 and a video program 82 are combined in combiner 92. The output of combiner 92, which is a composite video signal can be transmitted via antenna 96 or sent on a cable via cable output unit 94. The composite video signal can also be transmitted via satellite or telephone lines.

Television programs can include closed captions embedded in the program. This information can be embedded in the Vertical Blanking Interval (VBI) lines (described below) of a television video signal. A VBI decoder 60a in the VCR 1 or in a television is used to retrieve the closed captions from the VBI lines and then the closed captions are displayed as text on a video monitor.

Other information can also be embedded in the VBI lines. For example, a directory to programs can be embedded in the VBI lines. The directory can either be transmitted in the VBI lines during a transmission or stored in the VBI lines of a video cassette tape along with the programs on the video cassette tape. The directory can be then be used to control a video cassette recorder (VCR) to access programs on the video cassette tape. Such a system is described in application Ser. No. 08/066,666, mentioned above. Other information in the VBI lines can include channel specific program guide (CSPG), program related information (PRI), Instant Information (II), a V(M) packet, a TPA packet, which are described below.

For example a program title can be transmitted in the VBI lines along with a program which is being recorded on a VCR cassette tape. The VBI decoder can retrieve the program title from the VBI lines and then store the program title and the position of the start of the program in RAM 33 of directory controller 30 to assist the user in accessing the program in the future from the VCR cassette tape.

As shown in FIG. 1A, VBI decoding can be implemented by coupling an input of a VBI decoder 60a to the output of a tuner 61, which is generally included in the majority of VCRs for tuning the VCR to a channel for off-the-air recording. The tuner 61 receives a TV signal from an antenna 63 or a cable TV signal source 64. Both the decoder, the tuner, and the interaction of both, are conventional in the art. Examples of commercially available VBI caption decoders include the TeleCaption 4000 Adaptor, commercially available from National Caption Institute, Falls Church, Va., the Teletext Decoder, available from Norpak Corporation, Ottawa, Canada, and the VBI Decoder CCD3000 available from ITT Semiconductor.

A decoder signal line 65 is coupled from the decoder to the VCR control logic circuit 21. The VCR control logic circuit 21 may be commanded by the microprocessor controller 31 to pass the decoded data to the directory 33a under control of a stored program in the RAM 33. For example, if the VBI data includes a program title, then the program causes the VBI information to be stored as a program title in the directory 33a. On command from a user, the directory contents are displayed on the video monitor 50a and the user can select a program to access by using keyboard 32a, as described in application Ser. No. 08/066,666, mentioned above.

Vertical Blanking Interval Lines

Figure 2:
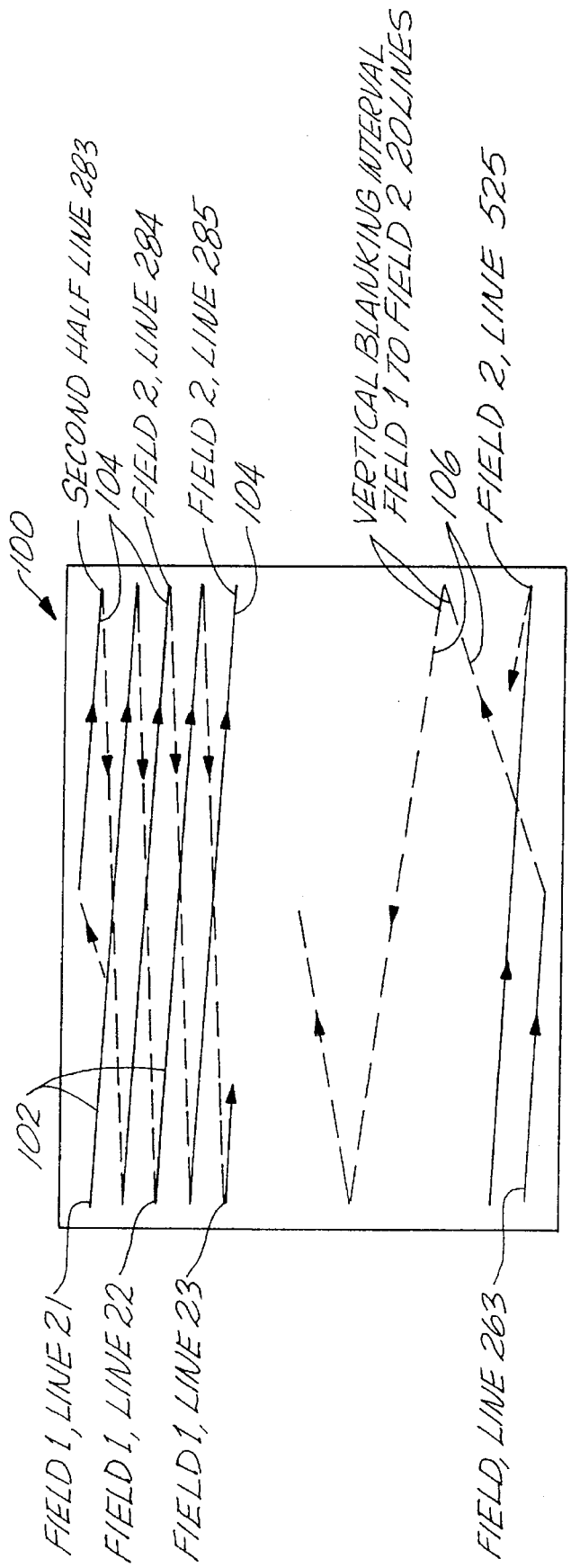
FIG. 2 is a diagram illustrating the fields, frames and vertical blanking interval of an interlaced television scanning raster.

FIG. 2 is a diagram illustrating the fields, frames and vertical blanking interval of an interlaced television scanning raster 100. The first field 102 of the television signal starts at the upper left corner of the screen and writes lines 21, 22, ... 263. At the bottom of the screen the beam writing the screen retraces in a series of lines back to the top of the screen. These lines are shown as the vertical blanking interval lines 106. During the retrace the writing to the screen is blanked; however, because the signal is still present, additional information can be sent during the vertical blanking interval. There are at least 20 lines in the vertical blanking interval, and it is possible to have additional VBI lines. After the vertical blanking interval, the second field 104 is written on the screen and lines 283, 284, ... 525 are interleaved between the lines of the first field 102. The two fields and the vertical blanking interval together constitute a frame.

FIG. 3 is a diagram illustrating the timing 110 of the vertical blanking interval (VBI) lines 1 to 20. As shown each vertical blanking interval line 112 occupies a portion of the time span. Each VBI line, such as 19 as shown in FIG. 3, can contain 2 to 4 bytes of information. When a message is embedded in the VBI lines the message is typically longer than 2 to 4 bytes and is spread across a number of fields and frames. The information contained in a VBI line can include a channel specific program guide (CSPG), program related information (PRI), Instant Information (II), a V(M) packet, a TPA packet, or a directory, as indicated by element 114 in FIG. 3.

Recorded Tapes with Information in the VBI Lines

FIG. 4 is a schematic of recorded tapes illustrating storing Video Index Search System (VISS) marks on a control track, TPA packets each containing a tape identification number, a program number, and an absolute address in vertical blanking interval lines, and a directory stored in the vertical blanking interval lines in accordance with principles of the invention. In FIG. 4 VISS marks 186, 188 and 190 are placed in the control track 166 at the start of the programs. This can be done at the time the tape is produced or copied from a master tape. On a pre-recorded tape the TPA packets 176 and directory 178 are also previously stored onto the tape on vertical blanking interval lines 19 and 20, respectively, which are designated as 167 and 168 in FIG. 4.

Figure 5A:
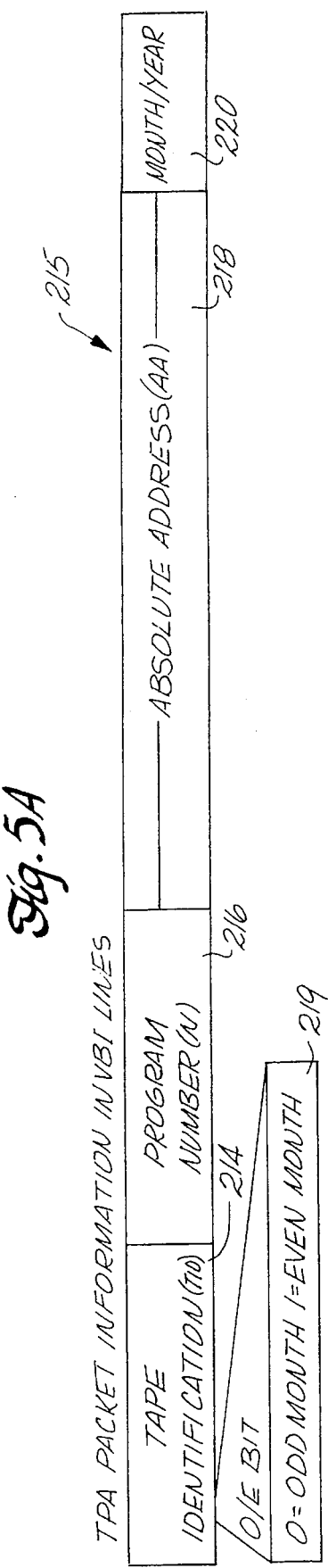
FIG. 5A is a schematic conceptually illustrating the information in a TPA packet in accordance with principles of the invention.

Each TPA packet 215 contains a tape identification 214, a program number 216 and an absolute address 218, as shown in FIG. 5A. The tape identification is a number that identifies the video cassette tape being used and is constant across the tape. The program number relates to the number of the program that is recorded on the tape adjacent to the TPA packet. For example, the TPA packets shown in FIG. 4 as TP$_3$A, correspond to program number 3. The absolute address in the TPA packet is an indication of the time (or distance) from the beginning of the tape to the location on the tape at which the particular TPA packet is written. Since the TPA is written in VBI lines across the tape, the absolute address varies across the tape. The TPA packet may also contain a month and year field 220, the use of which is described below.

Figure 5B:
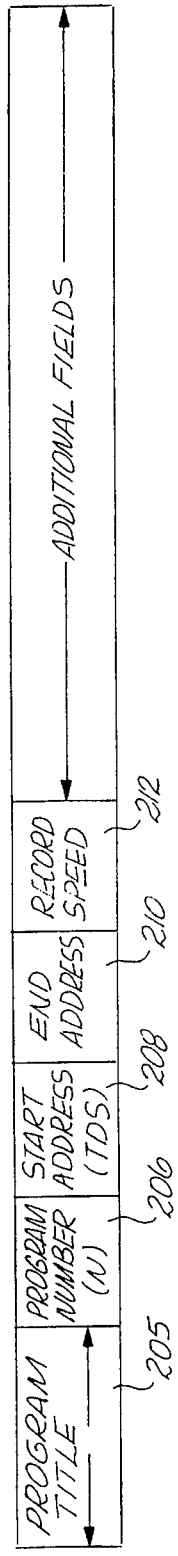
FIG. 5B is a schematic conceptually illustrating the information in a directory for a program in accordance with principles of the invention.

Each directory entry is used to store information about a program stored on the recording tape. For example, a directory may contain for a program: the program title 205, the program number 206, the start address 208, the end address 210 and the record speed 212, as shown in FIG. 5B. Additional fields 204 can be provided to allow room for expansion.

The TPA packets and the directory information can be used along with the VISS marks for accessing programs on the tape. The directory on the tape is accessed and stored in directory 33a and displayed to a user, who can then select a program to view. The VCR will then access the program using the information in the TPA packets stored along the tape and the information in the directory. By comparing the start address of the program in the directory with the absolute address in the TPA packet it can be determined whether to advance or rewind the tape to access the beginning of the selected program, which is marked by a VISS index mark. Then the program can be played by the VCR. The method of accessing programs on a pre-recorded tape is further described in application docket number 25845/LWT, filed Dec. 15, 1993, which is incorporated herein by this reference, as though set forth in full.

As described in application docket number 25845/LWT, filed Dec. 15, 1993, TPA packets and VISS marks can be recorded on home recorded tapes to assist in accessing programs on a tape. In the case of home recorded tape the directory is retained in RAM 33 rather than in a VBI line.

Information Transmitted in the VBI Lines

The types of information that can be transmitted in a VBI line include: a channel specific program guide (CSPG), program related information (PRI), Instant Information (II), a V(M) packet, TPA packet, and a directory, as indicated by element 114 in FIG. 3.

Figure 6:
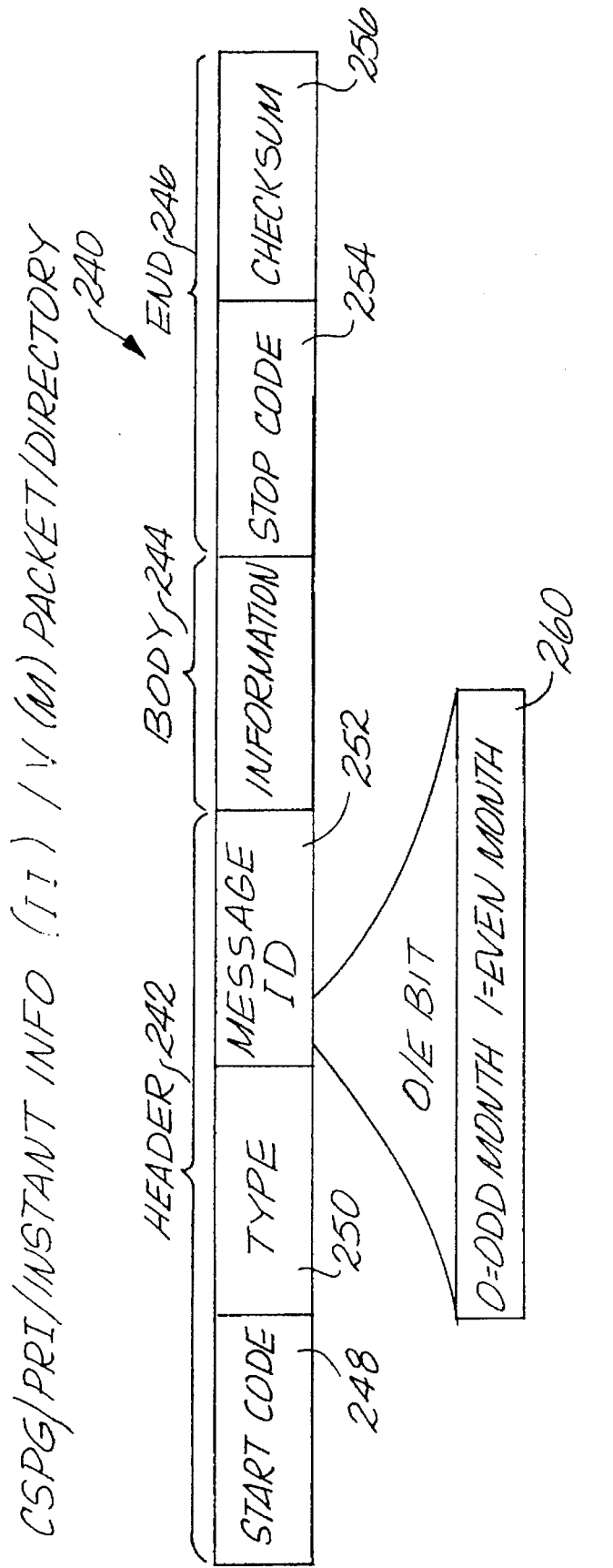
FIG. 6 is a schematic conceptually illustrating the header, body and end of a CSPG, PRI, Instant Information (II), V(M) packet, or directory as stored in a VBI line in accordance with principles of the invention.

The format for transmitting the information in a VBI line is shown in FIG. 6. This same format applies to channel specific program guide (CSPG), program related information (PRI), Instant Information (II), V(M) packets, TPA packets, and directories that are transmitted in a VBI line. The transmission begins with a header 242 that includes a start code 248, a type code 250, and a message ID 252. The type code indicates the type of message. The message ID can be used to identify a message.

The header 242 is followed by the body 244, which contains the information of the message. For example, the CSPG is the combination of the program information for a plurality of programs that will be transmitted in an upcoming predetermined time on a particular channel. The information for each program may include:
- Title of program
- Program length in minutes
- Day and time of day of transmission
- Station call letters (e.g. KCET or KCAL) or 4-letter abbreviation of station name (e.g. SHOW for Showtime)
- Channel number In addition to the above information, the channel specific program guide may also include compressed code numbers representing a channel, date, time and length. Also a description of the programs can be included.

Program related information (PRI), which can also be referred to as Instant Information (II), is information transmitted in the VBI that is related to a program being aired which is available upon user command either concurrently with the program or at a later time. Examples of PRI include statistics of baseball players during a baseball game, recipes given out during a cooking lesson, and problem assignments and answers after an educational program.

V(M) packets transmitted in the VBI can be used to mark the beginning of sections of a video magazine or used to mark the beginning of a program.

The TPA packet and directory and their use for accessing recorded programs have been described above.

Following the body 244 is the end 246, which contains a stop code 254 and a checksum 256.

Encrypting Information in VBI Lines

Now that the types and formats of the information have been described, the methods for encryption and decryption of the information will be discussed. The purpose of encrypting the information is to protect against unauthorized access of the information.

In general messages embedded within a vertical blanking interval are encoded by generating a key dependent on time and the message and then using the key to select a table or tables for mapping portions of the message into an encrypted message. The method of encryption applies to messages that are transmitted, and to information that is stored on a recorded tape in the VBI lines. In digital tapes it is not necessary to use VBI lines because there is an area of tape available for the information. The methods of encryption and decryption described herein are equally applicable to information that is recorded on a digital tape.

Figure 8A:
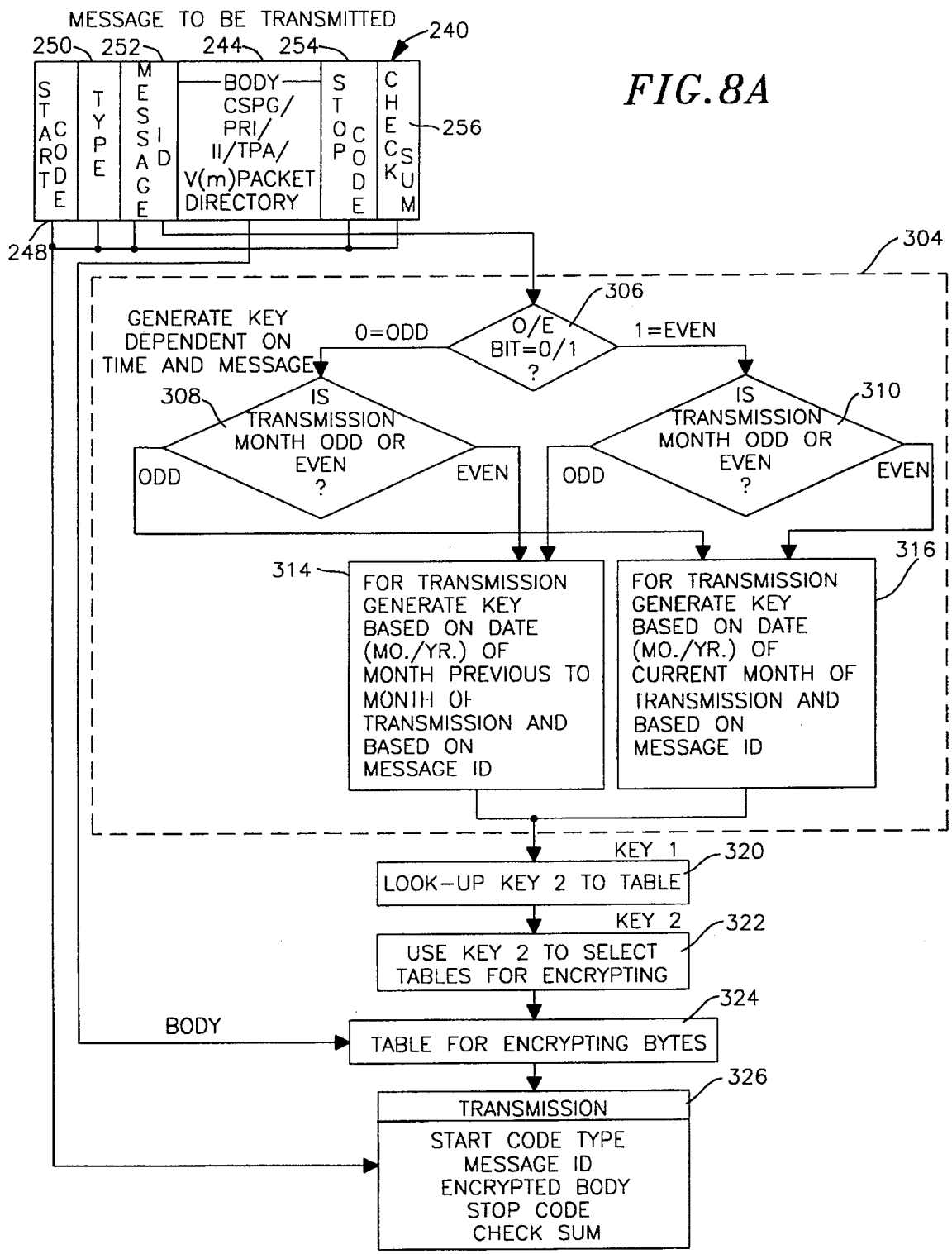
FIG. 8A is a flow chart of a method for encrypting information embedded in a video program that is transmitted according to the present invention.

FIG. 8A is a flowchart of a method for encrypting information embedded in a video program that is transmitted according to principles of the present invention. The method of FIG. 8A can be implemented by a program for a microprocessor or a computer at the transmitter. A message to be transmitted is shown as element 240 in FIG. 8A and corresponds to element 240 of FIG. 6. As shown the message consists of a start code, type and message ID that constitute the header of the message. The body of the message, which can be either CSPG, PRI, II, a V(M) packet or a directory, follows the header. The end field, which includes a stop code and a checksum, follows the body. The body of the message is the portion of the message that needs to be protected with encryption.

Figure 8B:
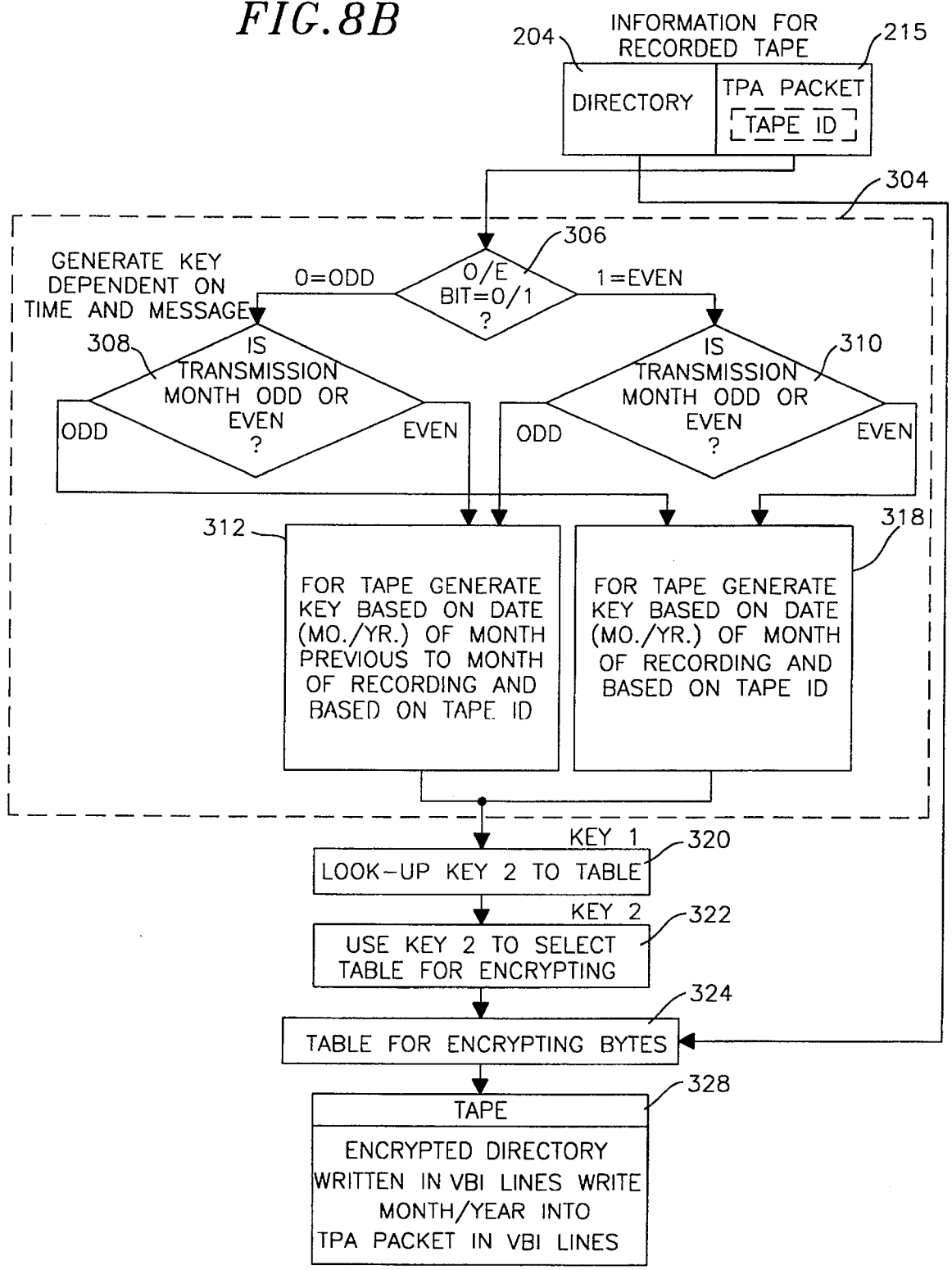
FIG. 8B is a flow chart of a method for encrypting information embedded in a video program that is recorded on a video cassette tape according to the present invention.

Shown in FIG. 8B are directory 204 and TPA packet 215, which represents information to be recorded on a tape.

First, the encryption of the body of the message to be transmitted of FIG. 8A will be described and then any modifications for encrypting information that is to be recorded on a tape, as shown in FIG. 8B will be described.

Figure 7:
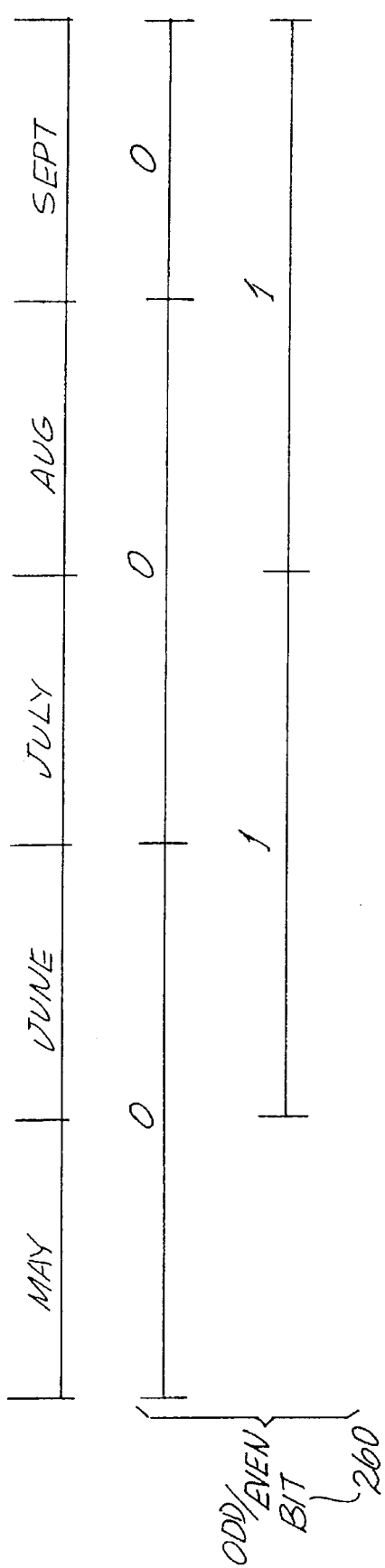
FIG. 7 is a illustration of the relationship of the Odd/Even bit to the months of a year according to the present invention.

In step 306 the odd/even bit of the message ID is inspected to determine whether it is a zero or a one. As shown in FIG. 6 the message ID includes an odd/even bit. If the odd/even bit is zero then the month is an odd month. If the odd/even bit is a one then the month is an even month. The odd/even bit is further described in FIG. 7. As shown in FIG. 7 the odd/even bit retains its value over a period of two months. For example, as shown the odd/even bit might be zero during the months of May and June. The reason the odd/even bit is zero for the months May and June is that the two month period begins during the month of May which has an odd number 5. The odd/even bit 260 in FIG. 7 is one spanning the months of June and July. In this case the odd/even bit is a one because the beginning month June is represented by the numeral 6 which is even. So the odd/even bit value is determined by whether the first month of a pair of months is odd or even.

The reason to have an odd/even bit is that if a transmission is near the transition between May and June then the transmitter may believe that the month is May however, the receiver, for example, a VCR may, according to its internal clock think that it is the month of June. Suppose this is the case. If the VCR clock indicates June of 1993 and the odd/even bit is zero then the VCR will know that the transmitter believes that it is May because the odd/even bit has been set to zero. However, if the odd/even bit is a one then the VCR will know that the transmitter is transmitting in the month of June.

So in step 306 the first step is to inspect the odd/even bit to determine whether it is a zero or a one. Note that when transmitting the odd/even bit can be set by the transmitter to either be a zero or a one. If the odd/even bit has been set to a zero then in step 308 if the date of transmission is odd then the next step for a transmission is step 316. On the other hand, if the date of transmission as tested in step 308 is even then for a transmission the next step is 314. In step 316 a key is generated based on the month and year of the current month of transmission and based on the message ID. In step 314 a key is generated based on the date of the month previous to the month of transmission and based on the message ID. For example, suppose the odd/even bit is set to zero to indicate odd and suppose the month and year of transmission is June of 1993, then the key will be generated based on the date of May 1993 as indicated in step 314.

There are many ways in which the key can be generated based on the month and year of transmission. For example, the month can be added or subtracted from the year, or the concatenation of the month and year can be added to the message ID and a remainder modulo 32 calculated.

Once the key is generated then in step 320 the key is used to look up a second key in a table. Then in step 322 the second key is used to select a table for encrypting the bytes of the body of the message in step 324. Once the bytes are encrypted then in step 326 the start code, type, message ID, encrypted body, stop code and checksum are concatenated together to form the encrypted message to be transmitted.

Figure 10:
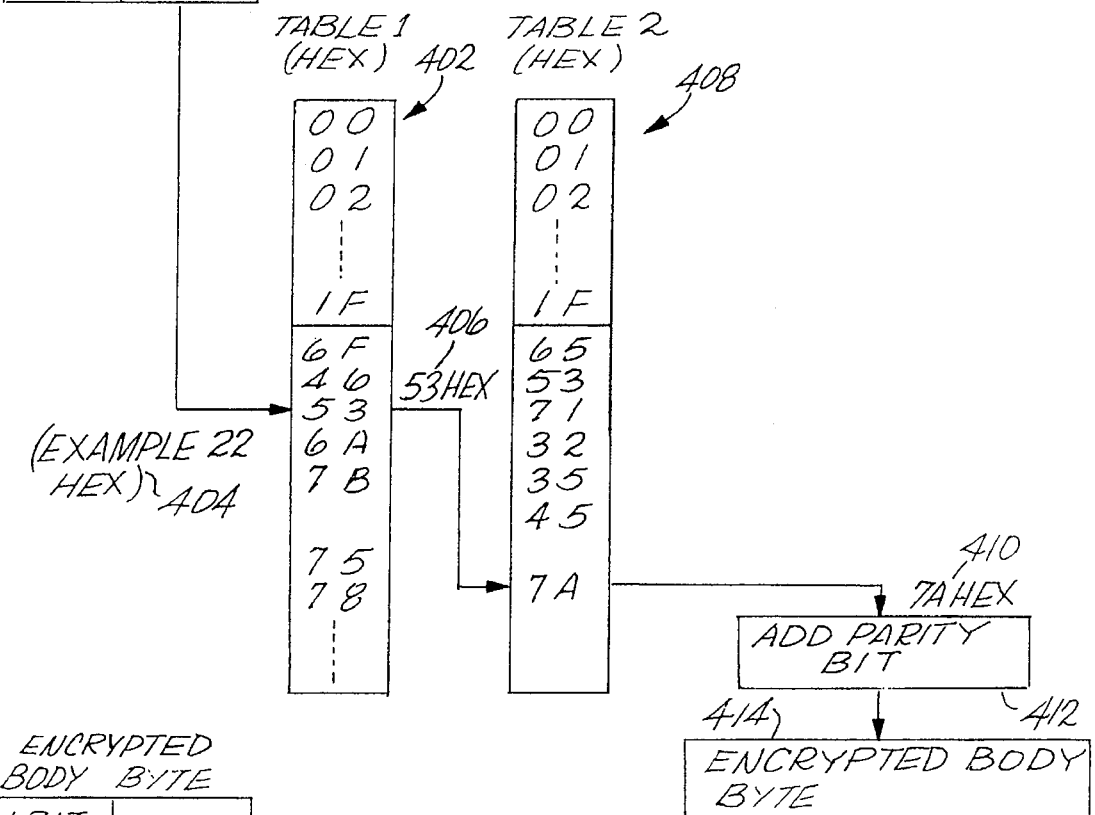
FIG. 10 is an illustration of the method of mapping bytes of a body to encrypted bytes according to the present invention.

FIG. 10 illustrates the manner of encrypting the bytes of the body of the message. For example, suppose a bit of the body is 22 HEX as shown as element 404 in FIG. 10. The value 22 HEX is used as an address to a table 402 to look up a substitute byte, in this case 53 HEX, designated as element 406 in FIG. 10. As an additional encryption step the looked up value 53 HEX can then be used as an address to a second table 408 to look up another substitute value, in this case 7A HEX designated as element 410 in FIG. 10. The original byte of a body has one bit of parity and after the table lookup another parity bit can be added in step 412 to produce an encrypted body byte 414. Note that in table 402 the values in the table from 00 through 1F HEX are mapped into the same values. This also applies to the first entries in table 408. By not changing the mapping of the lower order entries in the table the method of encryption is more difficult to determine.

The method of FIG. 8B for encrypting information recorded on a tape such as a directory as shown in element 204 of FIG. 8B, is similar to the encoding of the body 244 of the message 240 of FIG. 8A. The method of FIG. 8*b* can be implemented by a program for a microprocessor or a computer. In the case of FIG. 8B, an odd/even bit is stored as a portion of the tape identification field as shown as element 219 in FIG. 5A. In step 306 the odd/even bit is examined to determine whether it is a zero or a one. Again, as in the case of an encryption for a transmission, the odd/even bit can be selected to be either zero or one. Then in steps 308 and 310 the month and year that the directory is recorded into the tape is inspected to determine whether the month is a odd or even month. If the month is determined to be odd in step 308 then the next step is step 318, and if it is determined to be even in step 308 the next step is 312. Similarly, if in step 310 the month is determined to be odd then the next step is 312 and if the month is determined to be even then the next step is 318. In step 312 a key is generated based on the date of the month previous to the month of recording. The key can also be a function of the tape ID. In step 318 a key is generated based on the date of the month of recording and can also be a function of the tape ID. The key that is generated is used in step 320 and step 322 to select tables for encrypting bytes of the directory. This can be done in the manner described in FIG. 10. Then in step 328 the encrypted directory is written into the VBI lines. Also the month and year of recording the encrypted directory is written into the TPA packet as shown in element 220 of FIG. 5A. The entire TPA packet 215 can be encrypted in the same manner.

The key based on the month and the tape ID can be generated in the same manner as indicated for steps 314 and 316.

When a message is received it must be decrypted. FIG. 9A is a flowchart of a method for decrypting information embedded in a video program that is transmitted according to principles of the present invention. The method of FIG. 9A can be implemented by a microprocessor realization of VCR control logic 21. Element 326 of FIG. 9A, which corresponds to element 326 of FIG. 8A, shows an encrypted body of a message. In step 364 the odd/even bit contained in the message ID of the message 326 is examined to determine whether the odd/even bit is a zero or one. If the odd/even bit is a zero then in step 366 the clock 80 of the VCR is examined to determine whether the VCR clock is at a month which is odd or even. If the clock 80 month is an odd month then the next step is step 374 and if the clock 80 month is even then the next step is step 372. If the odd/even bit is a one then if the clock 80 month is odd as determined in step 368 the next step is 372 and if the clock 80 month is an even month then the next step is step 374. In step 372 a key is generated based on the date of the month previous to the month on the clock 80 and can also be generated as a function of the message ID. In step 374 the key is generated based on the date of the current month on the clock 80 and can also be generated as a function of the message ID. The method of generating the key based on the month and the message ID can be as indicated for steps 314 and 316 above. After the key is generated then in step 378 the key is used to look up a second key in a table which is then used to select a table or tables for decrypting bytes in step 380. In step 382 the tables for decrypting bytes are used to decrypt each byte.

Figure 11:
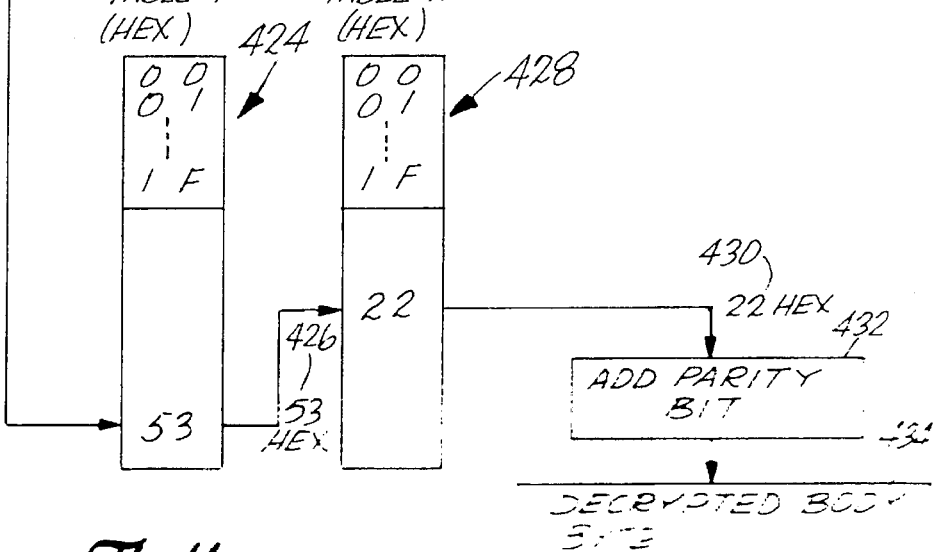
FIG. 11 is an illustration of the method of mapping encrypted bytes of a body to decrypted bytes according to the present invention.

FIG. 11 is an illustration of the method of mapping encrypted bytes of a body to decrypted bytes according to the present invention. As shown in FIG. 11 the encrypted byte 420 is used as an address to table 424. For example, if byte 420 is 7A HEX then this is used as an address and the output of table 424 is 53 HEX which is represented as element 426 in FIG. 11. This output of table 424 can then be used to look up another substitute byte in table 428 and in this case 22 HEX would be the output of table 428. Then in step 432 the parity bit would be added to the output of the table 428 to complete the mapping of encrypted body byte 420 to decrypted body byte 434.

In step 384 the decrypted body is recorded onto the VCR tape. In step 386 VCR clock 80 value for the month and the year and the odd/even bit from the message ID is recorded onto the VCR tape into the TPA packet as shown in FIG. 5A.

The method for decrypting an encrypted directory that has been recorded onto the tape as indicated in element 328 of FIG. 9B, which corresponds to element 328 of FIG. 8B, is similar to the decryption of the encrypted body of element 326 of FIG. 9A. The method of FIG. 9B can also be implemented by a microprocessor. The key difference is that step 376 is substituted for step 374 and step 370 is substituted for step 372. In step 370 a key is generated based on the month previous to the month that is in the TPA packet of element 328 and can also be generated based on the tape ID. In step 376 the key is generated based on the date of the month in the TPA packet of element 328 and can also be based on the tape ID. The key that is generated is again used to look up another key in step 378 and then to select tables 382 for decrypting the bytes in step 380. The result is a decrypted directory 388. An example of the encryption and decryption will now be given.

For a message that is transmitted, suppose the original message is: "The red fox ran over the fence." Suppose the year and month of transmission is June of 1993 and suppose the odd/even bit is set to be odd. Since the odd/even bit is odd and the year and month of transmission is June of 1993 the key for encrypting the message will be based on May of 1993. After encoding according to FIG. 8. The encrypted message would be funsieu31;lnfEidpak;auefaue;faie. The VCR 1 would then receive the encrypted message. If the month and year of VCR clock 80 is June of 1993, then when the VCR reads the odd/even bit from the message ID and determines it is odd then the key will be generated based on May of 1993. The decrypted message will be "The red fox ran over the fence." As a second example, suppose that the encrypted message is recorded on a tape and suppose that the month and year in VCR clock 80 is December 1993, suppose the year and month recorded in the TPA packet on the tape is June of 1993 and suppose the odd/even bit recorded in the TPA packet is odd. Then when the VCR 1 decrypts the encrypted message it will generate a key based on May of 1993. The decrypted message will be "The red fox ran over the fence."

Scrambling/De-scrambling of Data

After encryption, the encrypted data can be scrambled by using a scrambling key to swap the bits of the encrypted data. The scrambling key is preferably a predetermined set of numbers that are selected from a number that is associated with the data transmitted in the VBI or recorded in the VBI on tape. For example, for prerecorded tapes, a predetermined number of bits of the tape identification number are used as a key. For example, seven bits, such as bits 22–28, of the tape identification number may be used. The tape manufacturer uses these bits to scramble the data recorded on the tape. In the VCR 1, the tape identification number 214 is read from the VBI and the predetermined set of bits are used to de-scramble the encrypted data. As a second example, for transmitted information, a predetermined number of bits of the type data 250 are used as a key. For example, four bits of the type data 250 may be used. The manufacturer of a master tape used by the transmitter or the transmitter itself may use these bits to scramble the data. The indexing VCR 1 reads the type data from the transmitted VBI and retrieves the predetermined set of bits as a key. The indexing VCR 1 then uses this key to descramble the transmitted data.

One example of scrambling and de-scrambling is to apply the 7 bits to pairs of alpha numeric characters in the data and depending upon whether the bit is one or a zero, swap the characters. For example, where a one digit appears the characters of the pair are swapped, where a zero appears, the characters are not swapped. For example, for a seven bit sequence of 1011001, the phrase CHRISTIE PARKER HALE becomes scrambled by switching the C and H of the first character pair to read HC for the first one in the seven bit sequence. The RI is not swapped because the second bit is a zero; the ST is swapped to TS because the third bit is a 1; the IE is swapped to read EI because the fourth bit is 1; and so forth. In addition, the pattern is repeated for each set of seven pairs. Spaces are included as a character. Thus, CHRISTIE PARKER HALE becomes HCRITSEI PAREK RHAEL. By applying the same seven bit sequence 1011001, the character sequence can be de-scrambled.

Since after encryption the body portion is scrambled, then before decryption the body portion must first be descrambled. It would also be possible to perform scrambling before encryption, which would require descrambling before decryption. Both of these combinations are within the scope of the invention.

Thus, there has been described methods for encrypting and decrypting information embedded in a video program that is either transmitted or recorded on a video cassette tape.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A method for encrypting information having a header portion and a body portion comprising the steps of:

reading a current month from a clock having an output as a function of time;

setting an odd/even month indication in the header portion to odd, if the current month read from the clock is an odd month, otherwise, setting an odd/even month indication in the header portion to even, if the current month read from the clock is an even month;

generating a first key based on the current month read from the clock if the odd/even indication is odd and the current month read from the clock is odd or if the odd/even indication is even and the current month read from the clock is even, otherwise generating the first key based on a month previous to the current month read from the clock if the odd/even indication is odd and the current month read from the clock is even or if the odd/even indication is even and the current month read from the clock is odd;

using the first key for encrypting the body portion to generate an encrypted body portion; and embedding the encrypted body portion and the header portion within a video signal to form a composite video signal.

2. The method of claim 1 further comprising the step of transmitting the composite video signal having the embedded encrypted body portion and the header portion.

3. The method of claim 1 further comprising the step of recording the composite video signal having the embedded encrypted body portion and the header portion.

4. The method of claim 1 further comprising the step of scrambling the encrypted body portion using a scrambling key.

5. The method of claim 4 wherein the step of scrambling the encrypted body portion using the scrambling key comprises the steps of:

assigning each bit of the scrambling key to a number of pairs of characters in the encrypted body portion;

swapping the characters of the pair, if the assigned bit is of a first type, otherwise, not swapping the characters of the pair, if the assigned bit is of a second type; and repeating the steps of swapping or not swapping for all pairs of characters of the encrypted body portion.

6. The method of claim 1 wherein the step of embedding the encrypted body portion and the header portion within a video signal to form a composite video signal comprises the step of encoding the encrypted body portion and the header portion into vertical blanking interval lines of the video signal.

7. The method of claim 1 wherein the step of using the first key for encrypting the body portion to generate an encrypted body portion comprises the steps of:

selecting a first table using the first key;

mapping each part of the body portion to a first encrypted part using the first table; and concatenating each first encrypted part to form an encrypted body portion.

8. The method of claim 7 wherein the step of mapping each part of the body portion to a first encrypted part using the first table comprises the steps of:

selecting a second table using the first key; and mapping each first encrypted part to a second encrypted part using the second table.

9. The method of claim 1 wherein the step of generating a first key comprises the step of performing a table lookup.

10. A method for decrypting information in a composite video signal having an embedded header portion and an encrypted body portion, the method comprising the steps of:

reading a current month from a clock having an output as a function of time;

extracting an odd/even month indication from the header portion;

generating a first key based on the current month read from the clock if the odd/even indication is odd and the current month read from the clock is odd or if the odd/even indication is even and the current month read from the clock is even, otherwise generating the first key based on a month previous to the current month read from the clock if the odd/even indication is odd and the current month read from the clock is even or if the odd/even indication is even and the current month read from the clock is odd; and using the first key for decrypting the encrypted body portion to generate a decrypted body portion.

11. The method of claim 10 further comprising the step of recording the decrypted body portion and the header portion on a video cassette tape.

12. The method of claim 10 further comprising the step of descrambling the encrypted body portion using a scrambling key.

13. The method of claim 12 wherein the step of descrambling the encrypted body portion using the scrambling key comprises the steps of:

assigning each bit of the scrambling key to a number of pairs of characters in the encrypted body portion;

swapping the characters of the pair, if the assigned bit is of a first type, otherwise, not swapping the characters of the pair, if the assigned bit is of a second type; and repeating the steps of swapping or not swapping for all pairs of characters of the encrypted body portion.

14. The method of claim 10 further comprising the step of decoding a vertical blanking interval to decode the embedded headed portion and the encrypted body portion from the composite video signal.

15. The method of claim 10 wherein the step of using the first key for decrypting the encrypted body portion to generate a decrypted body portion comprises the steps of:

using the first key to select a first table;

mapping each part of the encrypted body portion to a first decrypted part using the first table; and concatenating each first decrypted part to form a decrypted body portion.

16. The method of claim 15 wherein the step of mapping each part of the encrypted body portion to a first decrypted part using the first table comprises the steps of:

selecting a second table using the first key; and mapping each first decrypted part to a second decrypted part using the second table.

17. The method of claim 10 wherein the step of generating a first key comprises the step of performing a table lookup.

18. The method of claim 10 further comprising the step of receiving the composite video signal from a transmitted signal.

19. The method of claim 10 further comprising the step of receiving the composite video signal from a recorded signal.

20. An apparatus for encrypting information having a header portion and a body portion, the apparatus comprising:

a clock having an output as a function of time;

means for reading a current month from the clock;

means for setting an odd/even month indication in the header portion to odd, if the current month read from the clock is an odd month, otherwise, setting an odd/even month indication in the header portion to even, if the current month read from the clock is an even month;

means for generating a first key based on the current month read from the clock if the odd/even indication is odd and the current month read from the clock is odd or if the odd/even indication is even and the current month read from the clock is even, otherwise generating the first key based on a month previous to the current month read from the clock if the odd/even indication is odd and the current month read from the clock is even or if the odd/even indication is even and the current month read from the clock is odd;

means for encrypting the body portion using the first key to generate an encrypted body portion; and means for embedding the encrypted body portion and the header portion within a video signal to form a composite video signal.

21. The apparatus of claim 20 further comprising means for transmitting the composite video signal.

22. The apparatus of claim 20 further comprising means for recording the composite video signal.

23. The apparatus of claim 20 further comprising means for scrambling the encrypted body portion using a scrambling key.

24. The apparatus of claim 20 wherein the means for embedding the encrypted body portion and the header portion within a video signal to form a composite video signal comprises means for embedding the encrypted body portion and the header portion into vertical blanking interval lines of the video signal.

25. The apparatus of claim 20 wherein the means for encrypting the body portion using the first key to generate an encrypted body portion comprises:

means for selecting a first table using the first key;

means for mapping each part of the body portion to a first encrypted part using the first table; and means for concatenating each first encrypted part to form an encrypted body portion.

26. The apparatus of claim 20 wherein the means for mapping each part of the body portion to a first encrypted part using the first table comprises:

means for using the first key to select a second table; and means for mapping each first encrypted part to a second encrypted part using the second table.

27. The apparatus of claim 20 wherein the means for generating a first key comprises mean for performing a table lookup.

28. An apparatus for decrypting information having a header portion and an encrypted body portion embedded in a composite video signal, the apparatus comprising:

a clock having an output as a function of time;

means for reading a current month from the clock;

means for extracting an odd/even month indication from the header portion;

means for generating a first key based on the current month read from the clock if the odd/even indication is odd and the current month read from the clock is odd or if the odd/even indication is even and the current month read from the clock is even, otherwise generating the first key based on a month previous to the current month read from the clock if the odd/even indication is odd and the current month read from the clock is even or if the odd/even indication is even and the current month read from the clock is odd; and means for using the first key for decrypting the encrypted body portion to generate a decrypted body portion.

29. The apparatus of claim 28 further comprising:

means for combining the decrypted body portion and the header portion to form a data packet; and means for recording the data packet on a video cassette tape.

30. The apparatus of claim 28 further comprising means for descrambling the encrypted body portion using a scrambling key.

31. The apparatus of claim 30 wherein the means for descrambling the encrypted body portion using the scrambling key comprises:

means for assigning each bit of the scrambling key to a number of pairs of characters in the encrypted body portion; and means for swapping the characters of each pair, if the assigned bit assigned to the pair is of a first type, otherwise, not swapping the characters of the pair, if the assigned bit is of a second type.

32. The apparatus of claim 28 further comprising means for decoding a vertical blanking interval to extract the embedded headed portion and the encrypted body portion from the composite video signal.

33. The apparatus of claim 28 wherein the means for using the first key for decrypting the encrypted body portion to generate a decrypted body portion comprises:

means for selecting a first table using the first key;

means for mapping each part of the encrypted body portion to a first decrypted part using the first table; and means for concatenating each first decrypted part to form an decrypted body portion.

34. The apparatus of claim 33 wherein means for mapping each part of the encrypted body portion to a first decrypted part using the first table comprises:

means for using the first key to select a second table; and means for mapping each first decrypted part to a second decrypted part using the second table.

35. The apparatus of claim 28 wherein the means for generating a first key comprises means for performing a table lookup.

36. The apparatus of claim 28 further comprising means for receiving the composite video signal from a transmitted signal.

37. The apparatus of claim 28 further comprising means for receiving the composite video signal from a recorded signal.

38. A method for encrypting and sending information having a header portion and a body portion and for decrypting the received information comprising the steps of:

reading a first current month from a first clock having an output as a function of time;

setting an odd/even month indication in the header portion to odd, if the first current month read from the first clock is an odd month, otherwise, setting an odd/even month indication in the header portion to even, if the first current month read from the first clock is an even month;

generating a first key based on the first current month read from the first clock if the odd/even indication is odd and the first current month read from the first clock is odd or if the odd/even indication is even and the first current month read from the first clock is even, otherwise generating the first key based on a month previous to the first current month read from the first clock if the odd/even indication is odd and the first current month read from the first clock is even or if the odd/even indication is even and the first current month read from the first clock is odd;

using the first key for encrypting the body portion to generate an encrypted body portion;

embedding the encrypted body portion and the header portion within a video signal to form a composite video signal;

transmitting the composite video signal;

receiving the transmitted composite video signal;

reading a second current month from a second clock having an output as a function of time;

extracting an odd/even month indication from the received header portion;

generating a second key based on the second current month read from the second clock if the odd/even indication is odd and the second current month read from the second clock is odd or if the odd/even indication is even and the second current month read from the second clock is even, otherwise generating the second key based on a month previous to the second current month read from the second clock if the odd/even indication is odd and the second current month read from the second clock is even or if the odd/even indication is even and the second current month read from the second clock is odd; and using the second key for decrypting the received encrypted body portion to generate a decrypted body portion.

39. The method of claim 38 further comprising the steps of:

scrambling the encrypted body portion using a first scrambling key; and descrambling the received encrypted body portion using a second scrambling key.

40. The method of claim 39 wherein:

the step of scrambling the encrypted body portion using the first scrambling key comprises the steps of:

assigning each bit of the first scrambling key to a number of pairs of characters in the encrypted body portion;

swapping the characters of the pair, if the assigned bit is of a first type, otherwise, not swapping the characters of the pair, if the assigned bit is of a second type; and repeating the steps of swapping or not swapping for all pairs of characters of the encrypted body portion.

41. The method of claim 38 wherein the step of embedding the encrypted body portion and the header portion within a video signal to form a composite video signal comprises the step of encoding the encrypted body portion and the header portion into vertical blanking interval lines of the video signal.

42. The method of claim 39 wherein the step of descrambling the encrypted body portion using the second scrambling key comprises the steps of:

assigning each bit of the second scrambling key to a number of pairs of characters in the encrypted body portion;

swapping the characters of the pair, if the assigned bit is of a first type, otherwise, not swapping the characters of the pair, if the assigned bit is of a second type; and repeating the steps of swapping or not swapping for all pairs of characters of the encrypted body portion.

43. The method of claim 38 further comprising the step of decoding a vertical blanking interval to decode the embedded headed portion and the encrypted body portion from the composite video signal.

* * * * *